United States Patent [19]
Rackley

[11] Patent Number: 4,742,357
[45] Date of Patent: May 3, 1988

[54] STOLEN OBJECT LOCATION SYSTEM

[76] Inventor: Ernie C. Rackley, 1704 Rockfield, Troy, Mich. 48098

[21] Appl. No.: 908,156

[22] Filed: Sep. 17, 1986

[51] Int. Cl.$^4$ .............................................. G01S 3/02
[52] U.S. Cl. ................................... 342/457; 342/450; 342/463; 342/388
[58] Field of Search ......................... 340/63, 988, 989; 342/457, 450, 463–465, 387, 389, 45, 455, 456

[56] References Cited

U.S. PATENT DOCUMENTS

| Re. 31,962 | 7/1985 | Brodeur | 342/389 |
|---|---|---|---|
| 3,646,580 | 2/1972 | Fuller et al. | 342/457 X |
| 3,665,312 | 5/1972 | Jarvis | 340/63 X |
| 3,747,104 | 7/1973 | Pansini | 342/457 |
| 3,886,554 | 5/1975 | Braun et al. | 342/457 |
| 4,023,176 | 5/1977 | Lurrie et al. | 342/457 X |
| 4,145,692 | 3/1979 | Armstrong et al. | 342/173 |
| 4,177,466 | 12/1979 | Reagan | 340/63 X |
| 4,229,620 | 10/1980 | Schaible | 342/457 X |
| 4,494,119 | 1/1985 | Wimbush | 342/457 |
| 4,638,294 | 1/1987 | Sakurai | 340/63 |
| 4,651,157 | 3/1987 | Gray et al. | 342/450 X |

Primary Examiner—Thomas H. Tarcza
Assistant Examiner—Tod R. Swann
Attorney, Agent, or Firm—James R. Ignatowski; Remy J. VanOphem

[57] ABSTRACT

A stolen object location system having a base station, a location network and an object unit which is associated with the object to be located. The location system is capable of operating in a plurality of different location modes ranging from simple triangulation to LORAN. The base station, upon being notified that the object has been stolen, will transmit a locate request message to the object unit specifying the location mode to be used and the transmission frequency of the object unit's transmitter. An electronic control in the object unit will control the operation of the object unit's receiver and transmitter in accordance with the location mode and transmission frequency specified in the locate request message. The electronic control will also initiate the transmission of an alarm message if the object unit loses communication with the base station, and is capable of transmitting a tattle-tale message, effectively relaying the alarm message of another object unit if the base station does not respond to the other object unit's alarm message.

36 Claims, 10 Drawing Sheets

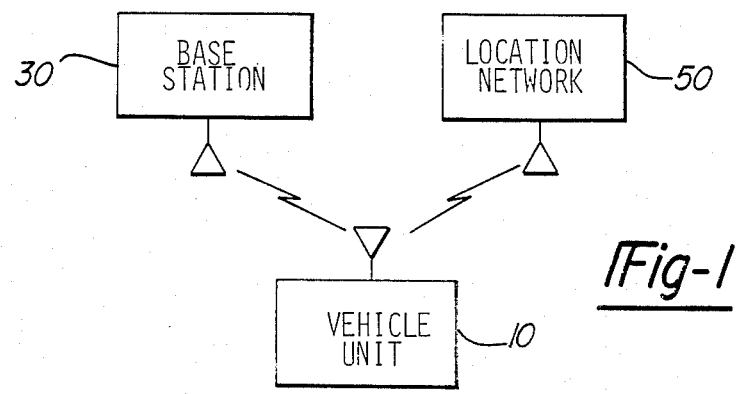
*Fig-1*
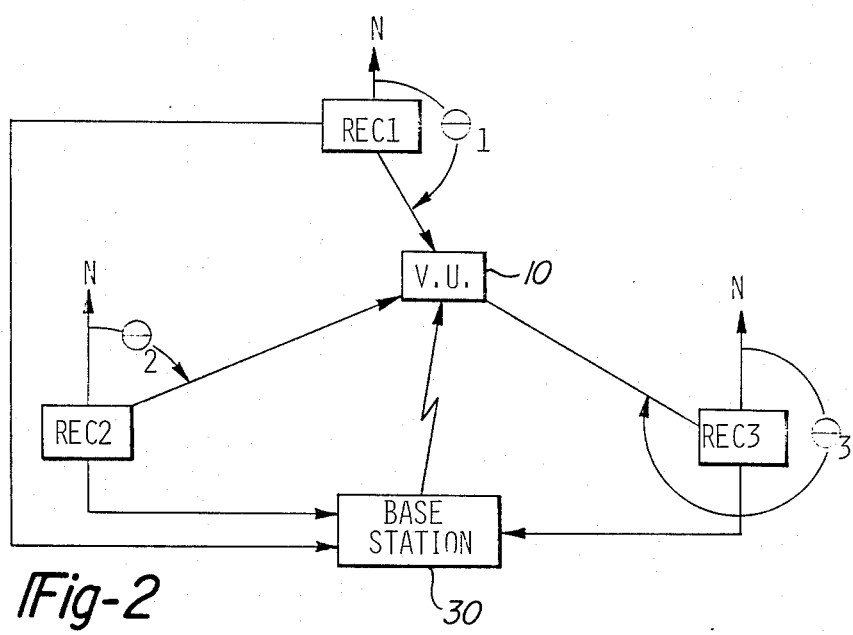
*Fig-2*
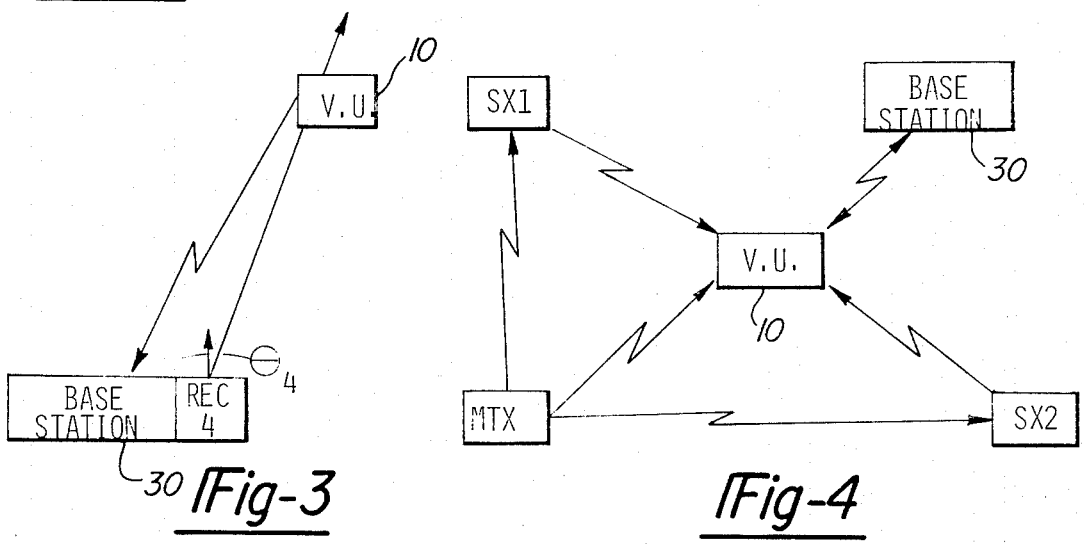
*Fig-3*
*Fig-4*

STOLEN OBJECT LOCATION SYSTEM

BACKGROUND OF THE INVENTION

1. Field of the Invention

The invention is related to the field of radio location systems and, in particular, to a system for locating stolen objects or objects removed from the owner's possession.

2. Description of the Prior Art

One of the major problems facing the owner of an object or item having any value is the fact that there is a relatively high probability of it being stolen. In particular, automobiles, trucks, the contents of trucks, aircraft, boats, and various types of off-road vehicles are the primary targets of thieves. These vehicles may be moved a considerable distance in a very short time, making recovery difficult, if not impossible. This problem has been further aggravated in recent years by the advent of the so called "chop shops" in which a stolen vehicle may be disassembled for parts in less than one hour, extinguishing any hope of recovery.

As is known, it is almost impossible to prevent the vehicle from being stolen. Experienced thieves can break into a locked vehicle and drive it away in less than a minute while others have used a tow truck to steal the vehicle. It, therefore, would be advantageous to locate the vehicle as soon as possible after it has been stolen to prevent it from being disassembled in a "chop shop", temporarily hidden for subsequent resale, or transported out of the state. In many of these cases, and in particular in the case of the "chop shop", the owner or the police may have less than an hour to locate the vehicle if there is to be any hope of recovery.

This problem is addressed by the auto theft detection system taught by Reagan in U.S. Pat. No. 4,177,466. In Reagan's theft detection system, each vehicle is identified by a unique code and each vehicle has a transponder responsive to its unique code to transmit a continuous locating signal. A plurality of location stations having proximity detection receivers and/or direction finding receivers, will generate signals indicative of the proximity of the vehicle to a particular location station or the direction of the vehicle from each of a plurality of receivers so that its location can be determined.

Another location system is taught by Jarvis in U.S. Pat. No. 3,665,312. In Jarvis' system, a radio alarm is activated by an illegal entry detector. Upon the detection of an illegal entry, the detector will activate a multiple frequency transmitter to transmit a coded signal which uniquely identifies that particular vehicle. The transmitter will sequentially shift the transmission frequency at predetermined and different time intervals. The transmitted signals are received by a plurality of direction finder receivers which permit the location of the vehicle to be determined.

In addition to proximity detectors and direction finder receivers, various other methods are available for radio location of a transmitting source. Wimbush, in U.S. Pat. No. 4,494,119, discloses a distress radio location system in which remotely located slave repeaters report the strength of a received distress signal to a central station. The central station computes the vehicle's location from the strength of the distress signal at each of the various slave repeaters. GEOSTAR is another type of location system using three remotely positioned satellites. As described in *Popular Science*, February 1984, pp 76–78 and 130, the location is computed by a ground station from the time a location request signal is received at each of the three satellites. The well known passive LORAN (Long Range Navigation) system is still another method that may be used to determine a vehicle's location.

Although the various location techniques are well known, the utilization of these techniques for the location of a stolen vehicle or object have not been fully exploited by the prior art, nor does the prior art teach a location system in which the transmission times by the vehicle mounted unit are not very short, difficult to detect, and difficult to jam or confuse.

SUMMARY OF THE PRESENT INVENTION

The invention is a system for the location of an object. The system includes an object unit associated with the object to be located, a location network, and a base station. The object unit has at least one receiver for receiving locate request messages and echo pulses transmitted by the base station, a variable frequency transmitter for transmitting messages and relaying the received echo pulses, and an electronic control for controlling the operation of the receiver and the variable frequency transmitter in response to the information contained in the locate request message. The information contained in the locate request message includes at least an identification number uniquely identifying the object unit associated with the object to be located, a mode code identifying one of at least two different location methods to be used to locate the object, and a frequency code identifying the transmission frequency of the variable frequency transmitter. The electronic controller has means responsive to the identification number contained in the locate request message being the same as its own identification number to activate the object unit, means for placing the receiver and transmitter in the location mode identified by the mode code and to change the transmission frequency of the variable frequency transmitter to the frequency identified by the frequency code. The location network cooperates with the messages and signals transmitted by the base station and the object unit to generate signals and messages to be used to determine the object's location. The base station includes a transmitter for transmitting the location request messages and the echo pulses, a receiver for receiving the messages and relayed echo pulses transmitted by the object unit and an operation's controller responsive to external inputs for activating the transmitter to generate the locate request messages and responsive to the messages and echo pulses received from the object unit and the messages generated by the location network to determine the location of the object.

One advantage of the location system is that it is capable of using several different location modes and can be used even if one or the other mode is inoperative so that at least one location method is always available. Another advantage of the location system is that the transmissions by the object unit are short and at different frequencies and, therefore, are difficult to detect and jam. Another advantage of the location system is that the power level of the object unit may be changed to enhance the accuracy of the location system when using direction finding receivers.

These and other advantages of the stolen object location system will become more apparent from a reading of the detailed description in conjunction with the drawings appended hereto.

BRIEF DESCRIPTION OF THE DRAWINGS

FIG. 1 is a block diagram showing the basic elements of the location system of the present invention;

FIG. 2 is a block diagram of the location system in the direction or distance-triangulation location modes;

FIG. 3 is a block diagram of the location system in the distance-direction location mode;

FIG. 4 is a block diagram of the location system in the LORAN location mode;

DETAILED DESCRIPTION OF THE PREFERRED EMBODIMENT

Figure 5:
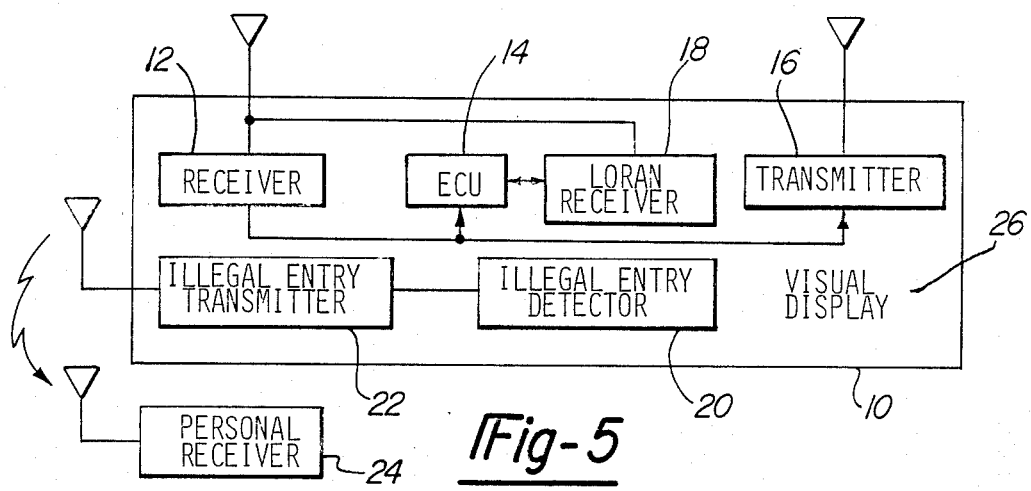
FIG. 5 is a block diagram of the vehicle unit 10.

The location system will be described with reference to a stolen vehicle; however, the location system is not limited to stolen vehicles, but may be used to locate any object which may be stolen or removed from the owner's posession. FIG. 1 is a block diagram of a stolen vehicle location system. The system includes a vehicle unit 10 which is mounted in the vehicle which is to be located, a stationary base station 30 having a transceiver capable of communicating with the vehicle unit 10, and a location network 50 capable of receiving transmissions from or transmitting to the vehicle unit 10 for location purposes. The vehicle may be an automobile, truck, aircraft, boat, or off-road vehicle. The location network 50 may consist of one or more receivers or transmitters, which are in direct communication with the vehicle unit 10 and/or the base station 30 as shall be explained hereinafter.

The vehicle or object unit 10 is capable of operating in at least two, but preferably three or four, different types of location modes upon command from the base station 30. The first location mode is a direction-triangulation (DRT) mode in which a transmission by the vehicle unit 10 is received by a location network, which consists of at least three remotely located direction finding receivers designated REC1, REC2, and REC3, as shown in FIG. 2. In this vehicle location mode, the base station 30, upon being notified that the vehicle is stolen, will transmit a message to the vehicle unit 10. This message will contain, at least, a vehicle identification number uniquely identifying the stolen vehicle, a flag or code identifying the location method as the direction-triangulation mode, and the frequency at which the vehicle unit 10 is to transmit. The same information is also transmitted to the direction finding receivers so that they can adjust their reception frequency to the vehicles unit's transmission. In response to this message a transmitter in the vehicle unit 10 will transmit a short message, normally containing the vehicle identification number, to the direction finding receivers. The direction finding receivers will lock on to the message transmitted by the vehicle unit 10 and each generate a message which is communicated to the base station 30. These messages will contain data indicative of the direction from which the transmission was received. The data transmitted by the receivers will correspond to the angle measured from a reference direction, such as true north, as shown in FIG. 2. For example, the directional receiver REC1 will transmit the angle $O_1$, REC2 will transmit $O_2$, and REC3 will transmit $O_3$. The base station 30, knowing the location of the three direction finding receivers REC1, REC2, and REC3, and the angles at which each receives the signal transmitted from the vehicle unit 10, can compute the exact location of the vehicle using a well-known triangulation algorithm. This location can then be converted to the grid coordinates of a map identifying the location of the vehicle. As is possible, the vehicle may be sufficiently close to one or more of the direction finding receivers such that the transmitted signal will saturate their direction finding receivers and degrade its angle detection accuracy. In this case, the direction finder receiver will transmit a code to the base station signifying that its receiver was saturated. In response to this code, the base station 30 will transmit another message to the vehicle unit 10 requesting that it repeat its transmission at a reduced power level. This procedure will be repeated until none of the direction finding receivers report a saturated condition, insuring maximum accuracy of the measured angle.

The second mode is a distance-triangulation (DST) mode in which the distance of the stolen vehicle is measured from three remotely located receivers, such as receivers REC1, REC2, and REC3, in FIG. 2. In this location mode, the base station 30, upon being notified that the vehicle is stolen, will transmit a message to the vehicle unit 10. This message will contain at least the vehicle identification number, a flag or code identifying the location method as the distance-triangulation mode, and the frequency at which the vehicle unit 10 is to transmit. This same information is transmitted to the three receivers so they can adjust their reception frequency to the same frequency. In response to this message, the vehicle unit 10 will activate an echo channel and await the transmission of an echo pulse by the base station 30. After a short period of time, the base station 30 will transmit an echo pulse which is received by the vehicle unit 10 and the three remotely located receivers. The vehicle unit 10 will echo pulse to the three receivers after a predetermined delay. Each of the receivers will start a timer in response to the echo pulse transmitted by the base station 30 which will be stopped in response to receiving the echo pulse retransmitted by the vehicle unit 10. Each receiver will report to the base station 30 the time between the reception of the echo pulse transmitted by the base station 30 and the echo pulse transmitted by the vehicle unit 10. The base station will then be able to determine from these time measurements the distance of the vehicle unit from each of the three receivers.

The third location method that is capable of being used by the vehicle unit 10 is a distance-direction measuring (DDM) mode, illustrated in FIG. 3. In this location mode, the location network includes a single direction finding receiver REC4 located adjacent to the base station 30, to prevent ambiguity. The direction finding receiver REC4 may be one of the three direction finding receivers REC1, REC2, or REC3, used in the triangulation method illustrated in FIG. 2, or a separate direction finding receiver. As before, the base station 30, upon being notified that the vehicle has been stolen, will transmit a message to the vehicle unit 10 which, again, will contain its vehicle identification number, a flag or code identifying the location mode as the distance-direction measuring mode, and a code specifying the frequency at which the vehicle unit 10 is to transmit. In response to this message, the vehicle unit 10 will activate its echo channel and await a second transmission by the base station 30. After a short period of time the base station 30 will transmit an echo pulse and simultaneously start a timer. As in the distance-triangulation method, the vehicle unit 10 will receive the echo pulse, then retransmit it back to the base station 30 after a precise fixed period of time. The timer in the base station 30 will measure elapsed time between the transmission of the echo pulse and the receipt of its transmission from the vehicle unit 10. The base station 30 will then subtract the precise delay period from the elapsed time and compute the distance "d" of the vehicle from the base station 30. The algorithm for computing distance "d" is the same as used for radar ranging, which is well known in the art. Simultaneously, the direction finder receiver REC4 will measure the angle $O_4$, which is the direction of the vehicle from the base station 30. Knowing both the direction and distance of the stolen vehicle from the base station 30, its position can be converted to map coordinates for pin-pointing its location.

The fourth method for locating the vehicle is based on the well known LORAN (Long Range Navigation) system developed by the Coast Guard during World War II. In this mode, the location network 50 includes a master transmitter MTX and two remotely located slave transmitters SX1 and SX2 as shown in FIG. 4. In the LORAN location mode, the base station 30, in response to being notified that the vehicle is stolen, transmits a message to the vehicle unit 10 in which the location method is identified as the LORAN location mode. The base station 30 will then wait until it receives location data transmitted by the vehicle unit 10. The vehicle unit 10, in response to receipt of the message from the base station 30, will activate a LORAN receiver 18 as shown in FIG. 5. The LORAN receiver 18 is of a type corresponding to those commercially available for private aircraft or small boats. In the LORAN system, the master transmitter MTX will repeatedly transmit a master pulse signal at a known repetition rate. The two slave transmitters, SX1 and SC2, will also transmit slave pulse signals at predetermined times after the master pulse signal is transmitted. The delay times of the slave pulses are differnet so that the LORAN receiver can distinguish between the two. Using the well known LORAN algorithm, the LORAN receiver 18 will determine its geographical position with respect to the master and salve transmitters which are stored in the vehicle unit 10, then transmitted back to the base station 30. The base station 30 will then convert this location data to map coordinates.

The stolen vehicle unit 10 may also have a alarm mode of operation in which, for some reason, the vehicle unit 10 is no longer able to communicate with the base station 30. This may be caused because the vehicle is taken outside the range of the base station's transmitter or because the vehicle unit's antenna or receiver is disabled.

In the operation of the stolen vehicle location system, the base station 30 periodically transmits a "keep alive" signal received by each vehicle having a vehicle unit 10. In response to the "keep alive" signal, the vehicle unit 10 sets a "keep alive" timer, which will time out at a predetermined time which is slightly longer than the interval between the "keep alive" signals. As long as the vehicle unit 10 keeps on receiving "keep alive" signals, its "keep alive" timer is reset before it times out and the system remains passive. However, if the vehicle unit 10 for any reason fails to receive a "keep alive" signal, its "keep alive" timer will time out and activate the vehcile unit 10 to transmit an alarm message containing the vehicle identification number and an alarm code.

Any vehicle within the transmission range of the vehicle transmitting the alarm message will receive and temporarily store the alarm message and set a tattle-tale timer. It then will wait a predetermined period of time, determined by the tattle-tale timer, for a response by the base station 30 to the alarm message. If the base station 30 responds by sending a locate request message containing the vehicle identification number contained in the alarm message, the other vehicle units 10 temporarily storing this alarm signal will dump it since they know the alarm message was received by the base station 30. However, if the other vehicle units 10 do not receive a locate request message containing the vehicle identification number contained in the alarm message before their tattle-tale timer times out, they will activate their own transmitter to transmit a tattle-tale message containing both its own vehicle identification number, the vehicle identification number contained in the alarm message, and a code or flag identifying it as a tattle-tale message. The base station 30 will respond to the tattle-tale message and send a locate request message to the vehicle unit 10 which sent the tattle-tale message requesting that it transmit in one of the four location modes described above so that its location can be determined. Although the exact location of the vehicle generating the alarm message cannot be pin-pointed by the tattle-tale message, its general location and/or direction from the base station 30 can be determined. Further, since it is possible that more than one vehicle unit 10 may transmit a tattle-tale message, the location of all of these vehicles may be used to help pin-point the vehicle transmitting the alarm signal.

The details of the vehicle unit 10 are shown in FIG. 5. Referring FIG. 5, the vehicle unit 10 includes a receiver 12 responsive to the messages sent by base station 30, an electronic control unit (ECU) 14, a transmitter 16, and the LORAN receiver 18. The vehicle unit 10 may also contain a visual display 26 and an illegal entry alert detection system consisting of an illegal entry detector 20, an illegal entry transmitter 22, and a personal receiver 24.

The illegal entry detector 20 may be any of the conventional detectors used to detect illegal entry of the vehicle, such as a seat pressure sensor, a motion sensor, an infrared (IR) sensor, or a combination of several sensors. Upon the detection of an illegal entry, the illegal entry detector 20 will activate the illegal entry transmitter 22 to transmit a signal activating the personal receiver 24 to generate an audio and/or visual signal.

The personal receiver 24 is normally carried by the owner or operator of the vehicle when he leaves the vehicle. Preferably, the personal receiver 24 can respond to the signal transmitted by the illegal entry transmitter 22 up to 1,000 yards. Upon being alerted of an illegal entry of the vehicle, the owner or operator will check to see if the vehicle has actually been stolen. If it has, he will contact the base station 30, informing an operator that the vehicle has been stolen and giving the operator the vehicle's identification number (VIN). This vehicle identification number will then be entered into the base station 30, which will transmit a locate request message to activate the stolen vehicle's unit 10. To avoid accidental activation, the base station 30 will transmit two identical locate request messages separated by a fixed time period. The vehicle unit 10 will only respond to the receipt of both the first and second locate request messages within the fixed time period.

The ECU 14 may be a hard-wired logic control but, preferably, is a programmed microprocessor, such as an INTEC 8086 or any other comparable commercially available microprocessor. The ECU 14 will decode the first locate request message and set a flag indicating its receipt. It will then set a delay timer and wait for the second locate request message. Upon receipt of the second locate request message, the ECU 14 will activate the transmitter 16 or the LORAN receiver 18 in accordance with the location mode contained in the message. If the location mode is the direction-triangulation mode, the transmitter 16 will transmit at the designated frequency a short message stored in the ECU 14 which contains only its vehicle identification code. The base station 30 will continue to transmit similar messages to the vehicle unit 10 each time changing the frequency of the signal to be transmitted so that it would be very difficult for the thieves to generate a signal which would interfere with the transmission of the transmitter 16. The subsequent messages may also instruct the vehicle unit to change the power level of its transmitted message as previously described.

In a like manner, if the location method code or flag in the received message is indicative of the distance-triangulation or distance-direction mode, the transmitter 16 will await the receipt of the echo pulse transmitted by the base station 30. It will then delay this echo pulse a precise period of time, then transmit it to the remotely located receivers or transmit it back to the base station 30; at the frequency contained in the locate request message.

Finally, if the location method code or flag is indicative of the LORAN mode, the vehicle unit 10 will activate its LORAN receiver 18. The LORAN receiver 18 will then receive the transmission by the LORAN network and determine its geographical location, which is communicated to the ECU 14 where it is stored. The ECU 14 will then construct a message containing the geographical data generated by the LORAN receiver 18 which is transmitted back to the base station 30 by the transmitter 16. For these latter transmissions, the base station 30 will have the capabilities to compute the map coordinates of the vehicle from the received information.

The ECU 14 also includes the "keep alive" timer and will activate the transmitter 16 when the "keep alive" timer times out and output the alarm message to the transmitter 16 for transmission. Any alarm messages received by the receiver 12 from a different vehicle unit 10 will be stored in the ECU's memory and the tattle-tale timer activated. A response message from the base station 30 before the tattle-tale timer times out will cause the ECU 14 to dump the stored alarm message. Otherwise, the ECU 14 will construct a tattle-tale message, as previously described, which will be transmitted by the transmitter 16 after the tattle-tale timer times out.

Figure 6:
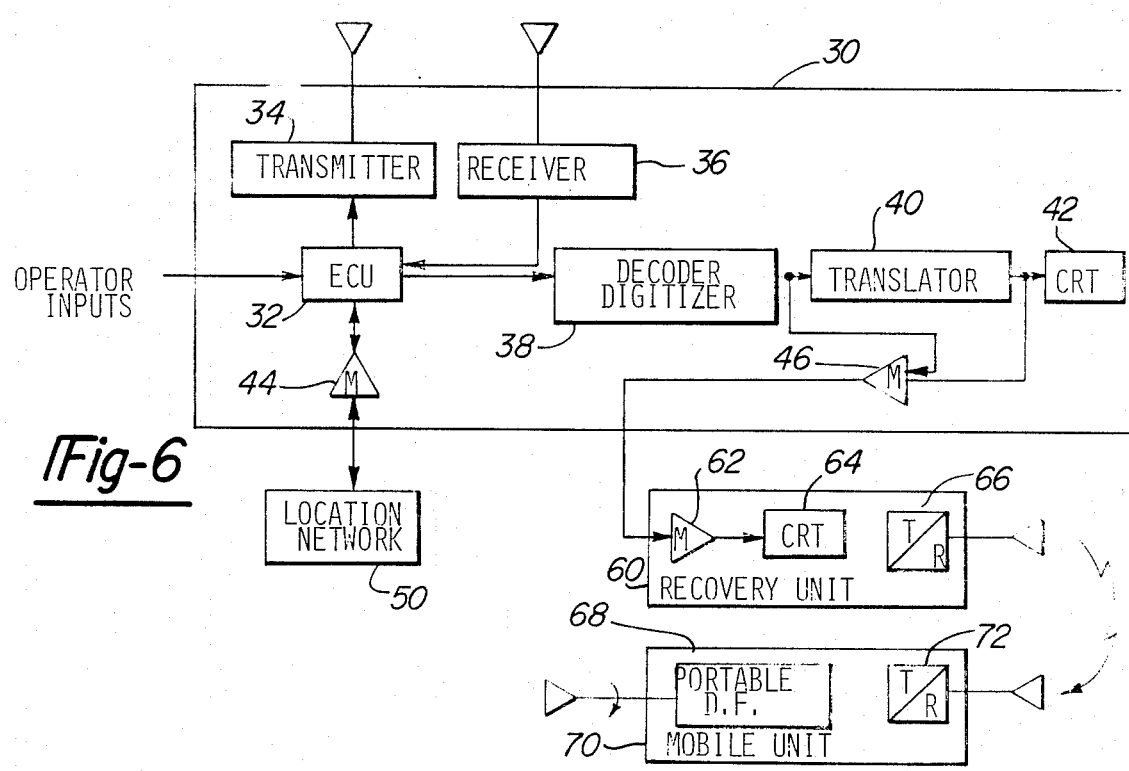
FIG. 6 is a block diagram of the base station 30.

The details of the base station 30 are shown in FIG. 6. Referring to FIG. 6, the base station 30 includes a base station electronic control unit (ECU) 32, which is capable of receiving inputs from an external source, such as an operator, and receive inputs from a receiver 36, and from the location network 50 through a modem 44. The ECU 32 stores the vehicle identification number of each vehicle in the system, the owner's name and address, and a description of the vehicle, including its license number. The ECU 32 will also have adequate storage and computational capabilities to perform the various functions previously described. The ECU 32 preferably is a programmed microprocessor of conventional design. The ECU 32 has a first output activating transmitter 34 to transmit the appropriate message as well as a second output for transmission of the vehicle's location to a recovery unit 60. Upon locating a vehicle using any of the four location methods described above, the location of the vehicle is transmitted in coded form to a decoder-digitizer 38, which converts the ECU's output to digitized data. The output of the decoder-digitizer 38 is received by a translator 40 which translates the digitized data to map coordinate data, which is displayed in a cathode ray tube 42 or any other type of visual display as is known in the art.

The map coordinate data, as well as other relevant information about the details of the stolen vehicle, such as its year of manufacture, style, and color, are transmitted via a modem 46 to the recovery unit 60. The recovery unit 60 may be part of the stolen vehicle system or may be the police station nearest the location of the stolen vehicle. The transmission between the base station 30 and the recovery unit 60 may be by telephone or by radio communication.

The recovery unit 60 will include a modem 62 for reconstructing the transmitted data and a cathode ray tube 64 or otehr display device for displaying the transmitted data. The recovery unit 60 will relay this information to a mobile unit 70, via transceivers 66. The mobile unit 70, which may be a special recovery vehicle or a police car in radio contact with the recovery unit 60 via a transceiver 72 will proceed to the computed map coordinates to locate the stolen vehicle. The mobile unit 70 may also have a direction finding receiver 68 to assist the mobile unit 70 in its final location of the stolen vehicle.

The base station's ECU 32 will receive angle and/or distance information, such as required in the direction or distance-triangulation modes or the distance-direction location mode, from the location network through the modem 44. The receiver 36 will receive the messages transmitted to the base station 30 from the vehicle unit 10. These messages include the echo pulse transmitted by the vehicle unit in the distance-triangulation and distance-direction location modes, the vehicle's geographical location from the LORAN receiver in the LORAN location mode, as well as alarm and tattle-tale messages. The ECU 32 will perform the necessary functions in response to the flags or codes contained in these messages.

The operator inputs to the ECU 32 are the vehicle identification number and owner's name received in response to a telephone call reporting the vehicle being missing as well as the location method that will be used. The ECU 32 will first verify that the identification number is a valid number and is associated with the person who made the call. After verification, the ECU 32 will activate the transmitter 34 to transmit a locate request message to the vehicle unit 10.

Figure 7:
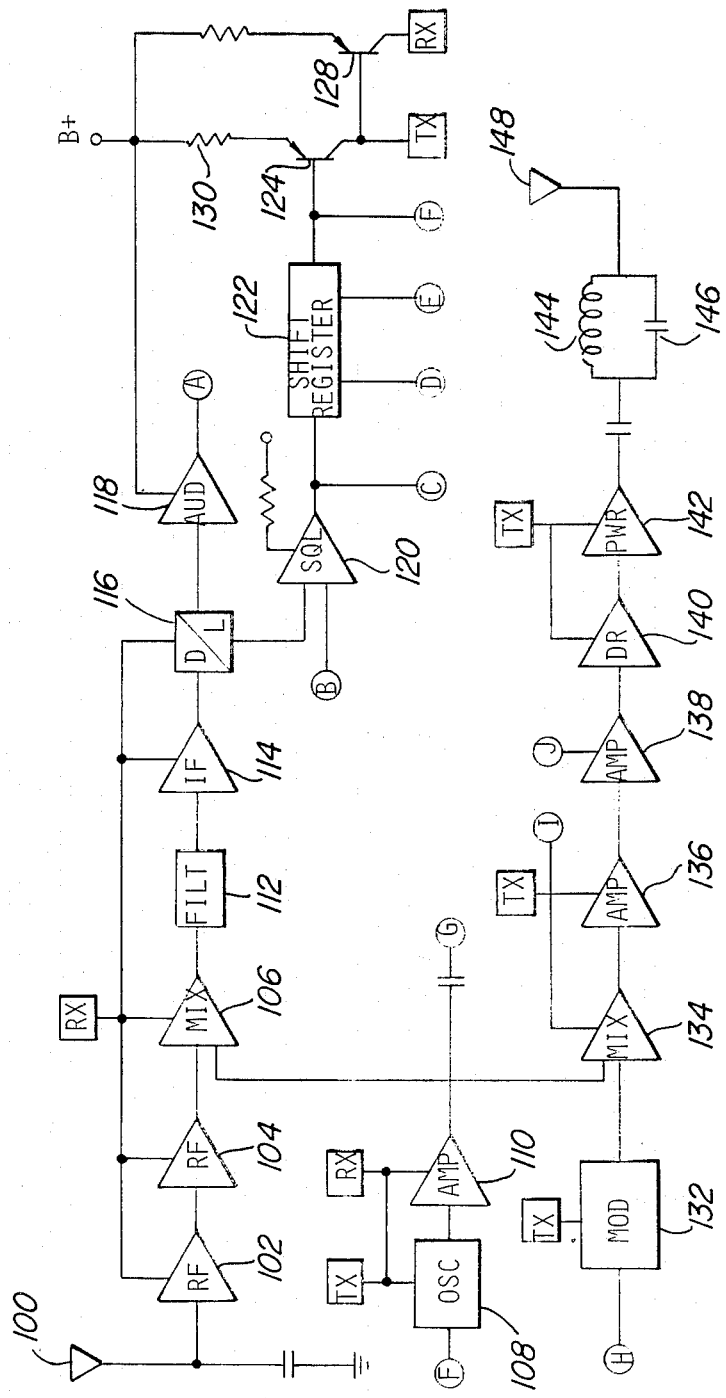
FIG. 7 is a circuit diagram of the vehicle unit's receiver and transmitter.

The details of the receiver 12 and transmitter 16 of the vehicle unit 10 are shown in FIG. 7. Referring to FIG. 7, the signal received by the vehicle unit's receiver antenna 100 is amplified by a pair of serially connected RD amplifiers 102 and 104. The output of the RF amplifier 104 is received by a mixer 106. The alternate input to the mixer 106 is received from a voltage controlled oscillaor 108 through an amplifier 110 which constitutes in cooperation with a microprocessor 200 a phase lock loop circuit 202.

A filter 112 passes the difference frequency output from the mixer 106 and attenuates all of the other frequencies as is known in the art. The filtered difference frequency is amplified by an IF amplifier 114 and received by a demodulator/limiter circuit 116, which demodulates the IF signal to produce an audio signal having a first frequency indicative of a 1-bit and a second frequency indicative of an 0-bit contained in the received message. The demodulated signal is amplified by an audio amplifier 118, which is received at terminal A of the microprocessor 200 which together with the phase lock loop circuit 202 constitutes the vehicle unit's ECU 14.

A squelch control circuit 120 responsive to a squelch control signal generated by the ECU's phase lock loop circuit 202 or by a signal from the demodulator/limiter circuit 116 generates a carrier detect signal which is applied to terminal C of the microprocessor 200 and to the input of a shift register 122. The carrier detect signal enables the microprocessor 200 to receive and store the output of the audio amplifier 118. The carrier detect signal will also be the echo pulse signal stored in the shift register 122 when the shift register 122 is enabled by an enable signal received from terminal D of the microprocessor 200. The echo pulse is shifted through the shift register 122 by the 10.24 $MH_z$ clock pulses received from terminal E of the phase lock loop circuit 202. The echo pulse shifted through the shift register 122 turns ON a transistor 124, which supplies voltage of the terminal TX through resistance 130. The terminal TX supplies electrical power to the transmitter portion of the circuit, activating the transmitter 16 to transmit. Additionally, the conductance of the transistor 124 turns a transistor 128 OFF. The output of the transistor 128 is connected to the terminal RX which supplies electrical power to the receiver portion of the circuit as indicated. The squelch control 120 and the shift register 122 constitute an echo channel transmitting the echo pulse from the receiver 12 to the transmitter 16.

The output of the amplifier 110 is also transmitted to a mixer 134 in the transmitter portion of the circuit. The other input the mixer 134 is received from a modulator 132 which receives a micromodulated input signal from terminal H of the microprocessor 200. This micromodulated input is the information contained in the transmitted messages which may be a stored message, data received from the LORAN receiver, or a combination thereof. The output of the mixer 134 is amplified by a pair of amplifiers 136 and 138 prior to being transmitted to a driver amplifier 140. The electrical power to the amplifier 138 is received from terminal I of the phase lock loop circuit 202 which controls the power level of the transmitted message. The phase lock loop circuit 202 will reduce the voltage of the amplifier 138 in response to a signal received from the base station 30 to reduce the power output level of the transmitter signal as previously described. The output of the driver amplifier 140 is transmitted to the input of a power amplifier 142 which activates a transmitter antenna 148 through a tuned circuit consisting of an inductance 144 and capacitance 146.

The output of the amplifier 110 is also fed back to terminal G of the phase lock loop circuit 202 and stabilizes the oscillation frequency of the phase lock loop circuit 202 at the frequency designated in the received message.

Figure 8:
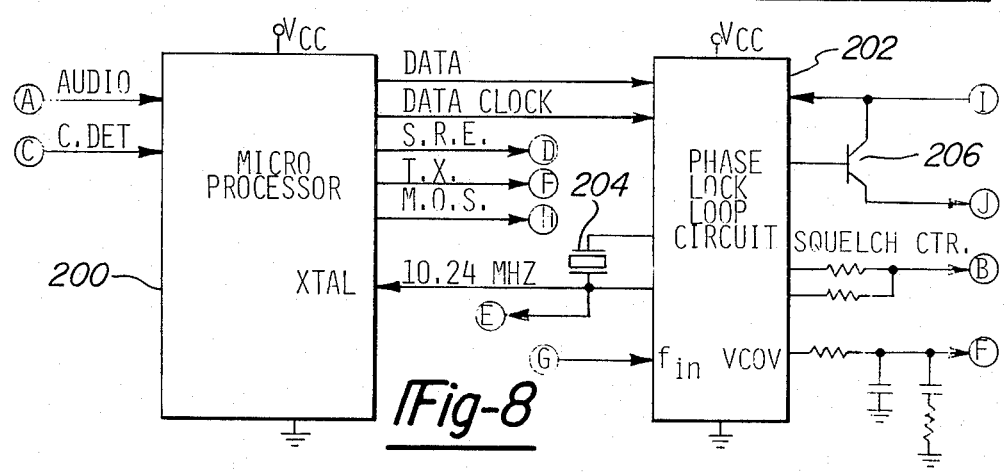
FIG. 8 is a block diagram of the ECU 14.

The details of the ECU 14 are shown in FIG. 8. Referring to FIG. 8, the ECU consists of the microprocessor 200 and the phase lock loop circuit 202, which is part of the variable frequency oscillator circuit for the receiver 12 and transmitter 16 of the vehicle unit 10.

Referring to FIG. 8, the microprocessor 200 receives the audio signal output from the receiver's audio amplifier 118 at input terminal A. The microprocessor 200 decodes the received audio signal and reconstructs the received message. The microprocessor 200 will also receive the carrier detect signal (C.Det.) generated by the squelch control circuit 120 which effectively deactivates the audio input circuits during the absence of a carrier signal rendering it immune to extraneous signals. A 10.24 $MH_z$ signal generated by the phase lock loop circuit 202 in combination with a crystal 204 is received at the XTAL input to the microprocessor 200. This 10.24 $MH_z$ signal is used in the ECU to generate the clock signals which control its operation. The 10.24 $MH_z$ is also used to clock the echo pulse through the shift register 122 to produce the precise delay in the retransmission of the echo pulse used in the distance-triangulation and distance-direction location methods.

The microprocessor 200 has five outputs, the data and data clock signals which control the oscillation frequency of the phase lock loop circuit 202; a shift register enable (S.R.E.) signal for enabling the shift register 122 when the vehicle unit 10 is in the distance-triangulation or the distance-direction location mode; a transmitter enable (TX) signal which is applied to the base of the transistor 124 which controls the application of electrical power to the transmitter 16; and the modulation output signal (M.O.S.), which is applied to the input of the transmitter's modulator 132 and contains the data to be transmitted, such as the vehicle identification number, geographical data when the vehicle unit 10 is in the LORAN location mode, or any other appropriate information to be included in the transmitted message.

The phase lock loop circuit 202 receives the data and data clock signals from the microprocessor 200, which determines the transmission frequency of the transmitter 16, a feedback signal from the amplifier 110, and the transmitter on signal TX, which changes the frequency of the phase lock loop circuit 202 to the predetermined frequency applied to the mixer 106 in the receiver 12. The output of the phase lock loop circuit 202 is a frequency controlling signal VCOV, which is applied to the input of the voltage controlled oscillator 108, a power level signal applied to the base of a transistor 206 which controls the voltage applied to the transmitter's amplifier 138, a squelch control signal which is applied to the receiver's squelch control circuit 120, whose output disables the audio input to the microprocessor 200 and the 10.24 $MH_z$ signal.

Figure 9:
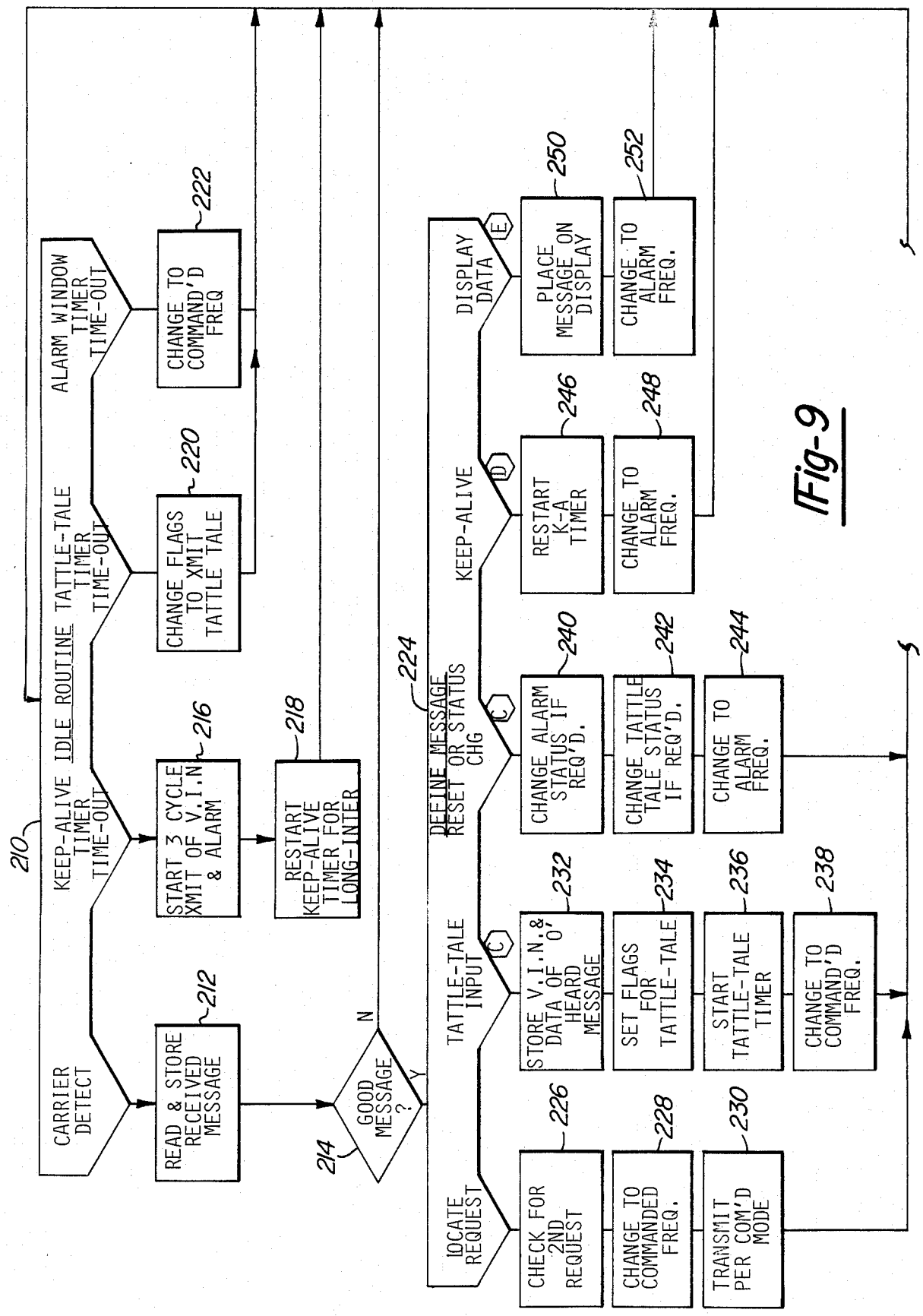
FIG. 9 is an overall flow diagram of the system.

The operation of the microprocessor 200 is best described with reference to the flow diagrams shown in FIGS. 9 through 15. FIG. 9 is the flow diagram showing the overall operation of the microprocessor 200. The idle routine 210 performs the function of keeping the various timers updated and monitors any message which may be received, including all messages from the base station 30 and alarm messages transmitted by another vehicle unit 10. In the event of a received message, the receiver will generate a carrier detect signal as previously described, and the microprocessor 200 will read and store the received message as indicated by block 212. The microprocessor 200 will then check to determine if it is a good message as indicated by decision block 214. A good message is one containing the vehicle unit's own vehicle identification number (VIN), a "keep alive" message, or an alarm message from another vehicle unit 10. If it is not a good message, the microprocessor 200 will dump the stored message and return to the idle routine 210. If the message is a good message, the microprocessor 20 will initiate the define message routine 224.

The idle routine 210 will also monitor the "keep alive" timer and when it times out, will initiate the transmission of three alarm signals as indicated by block 216, then restart the "keep alive" timer as indicated by block 218. The idle routine 210 will also monitor the tattle-tale timer, and if it times out, will set a flag to transmit a tattle-tale message, as indicated by block 220, which will contain its own as well as the vehicle identification number of the vehicle unit 10 which sent the alarm message and a flag or code identifying the message as a tattle-tale message. The idle routine 210 will also monitor its own alarm window timer and, if it times out, it will change its transmission frequency of its own alarm message to the commanded frequency as indicated by block 222.

The define message routine 224 will examine the received message to determine what kind of message it is. If the message is a locate request message, it will check to determine if it is the second locate request message as indicated by block 226. If it is the second locate request message, the microprocessor 200 will change the transmitter's frequency to the commanded frequency, as indicated by block 228, then transmit a message in accordance with the commanded location mode, as indicated by block 230, then return to the idle routine 210. If the received message is an alarm message from anotehr vehicle unit 10, it is identified as a potential tattle-tale input and the VIN and data of the overheard alarm message is stored in the microprocessor 200 as indicated by block 232. The define message routine 224 will then set flags identifying it as a tattle-tale message as indicated by block 234, start the tattle-tale timer as indicated by block 236, change the transmitter's frequency as indicated by block 238, and return to the idle routine 210.

When the received message is a reset or change status message transmitted by the base station 30, the microprocessor will, if required, change its alarm status as indicated by block 240 or change its tattle-tale status as indicated by block 242, then change the transmission frequency to the alarm frequency as indicated by block 244.

If the received message is a "keep alive" message, the microprocessor will restart the "keep alive" timer as indicated by block 246 and change the transmitter frequency to the alarm frequency as indicated by block 248, and then return to the idle routine 210.

The vehicle unit 10 may also include a visual display, such as the visual display 26, on which visual messages can be displayed. The information to be displayed may be contained in the received message or may be a canned message stored in the microprocessor 200 which can be extracted by a code contained in the received message. In this event, the base station 30 will transmit a display data message. In response to a display data message, the microprocessor will transmit the data to the display, as indicated by block 250, then change the transmitter's frequency to the alarm frequency as indicated by block 252, and return to the idle routine 210.

Figure 10:
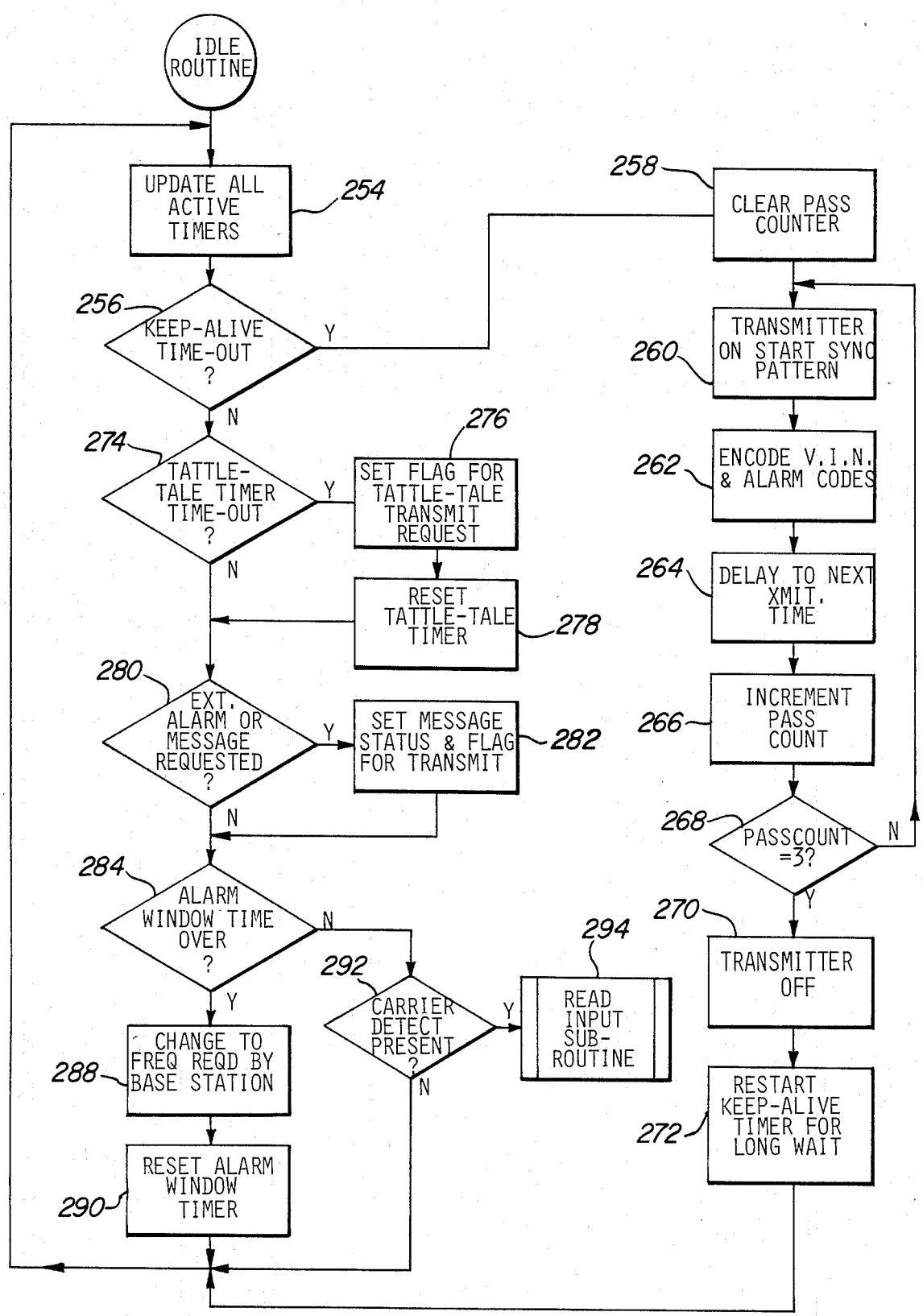
FIG. 10 is a flow diagram of the idle routine.

The idle routine 210 is shown in greater detail in the flow diagram in FIG. 10. The idle routine 210 begins with the updating of all active timers as indicated by block 254. It will then query decision block 256 if the "keep alive" timer timed out. If it has timed out, the idle routine 210 will clear a pass counter, as indicated by block 258. The pass counter keeps track of the number of times the alarm message was transmitted. The idle routine will then turn the transmitter ON and start the synchronized pattern for the transmission of the alarm signal, block 260. It will then encode the VIN and alarm codes, block 262, and delay to the next transmission time, block 264, at which time the alarm message is transmitted. The pass counter will then be incremented, block 266, and the content of the pass counter will be queried, decision block 268, to determine how many alarm messages have been sent. If less than three alarm messages were sent, the steps indicated by blocks 260 through 268 will be repeated until three alarmmr messages are sent. After all three alarm messages are sent, the transmitter will be turned OFF, block 270, the "keep alive" timer restarted for a longer period of time, block 272, and the procedure returned to the beginning of the idle routine, block 254.

If the "keep alive" timer has not timed out, the routine will then inquire, block 274, if the tattle-tale timer has timed out. If it has, the routine will set the tattle-tale transmission request flag, block 276, then reset the tattle-tale timer, block 278, and return to the routine. If the tattle-tale timer has not timed out, the routine will inquire, decision block 280, if an external alarm or message has been requested. If it has, the routine will set the message status and flag for transmission, block 282, then return to the idle routine 210. If no external alarm or message is requested, the routine will inquire, decision block 284, if the alarm window time is over. If it is, the routine will change to the frequency requested by the base station 30, block 288, then reset the alarm window timer, block 290, then return to the beginning of the idle routine 210. If the alarm window time is over, the routine will iquire, decision block 292, if the carrier detect signal is present. If it is, the idle routine 210 will proceed to the "read input" subroutine 294 otherwise the idle routine 210 will return back to its beginning block 254.

Figure 11:
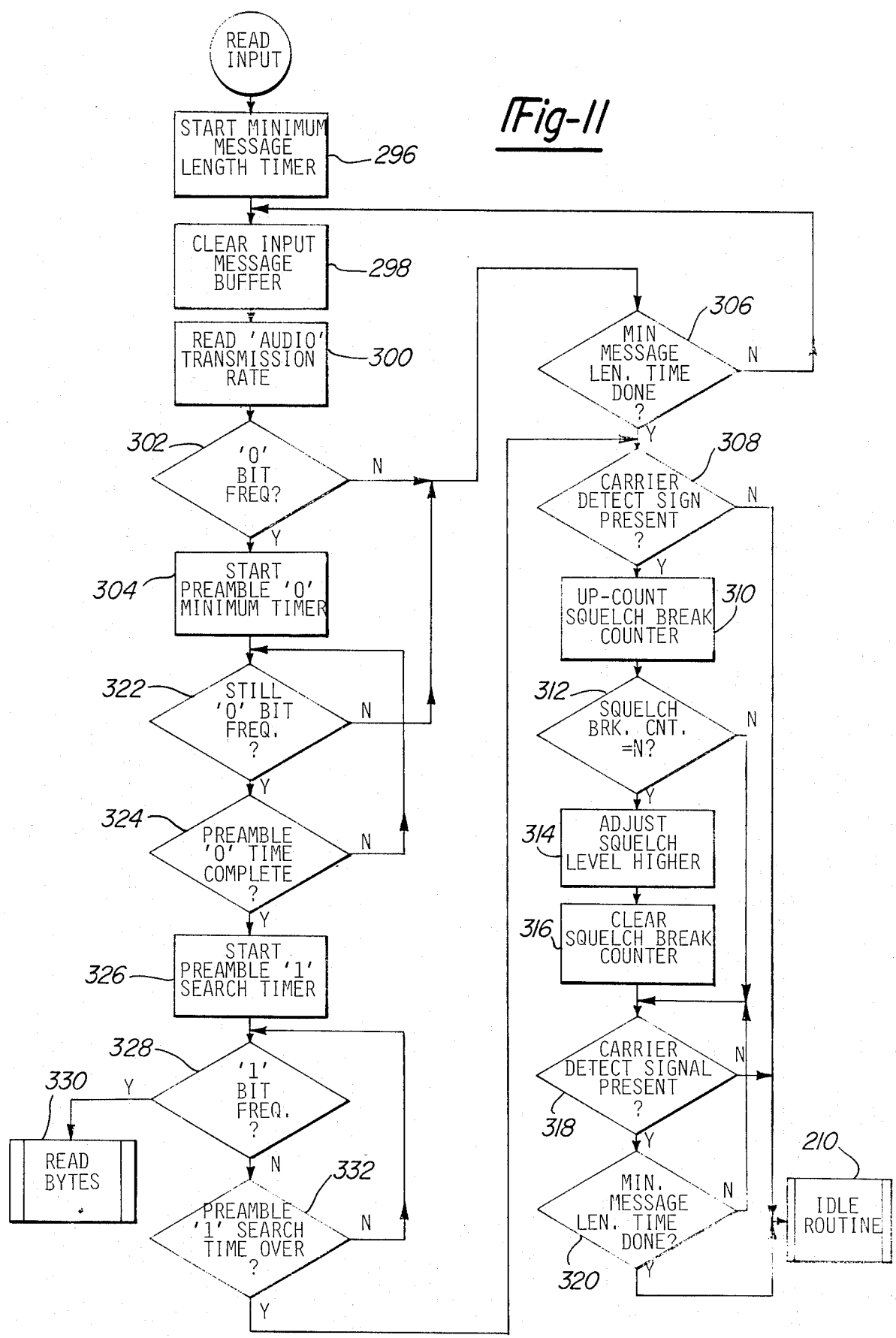
FIG. 11 is a flow diagram of the read input routine.

The details of the "read input" subroutine 294 are shown in FIG. 11. The routine begins by starting the minimum message length timer, block 296, clears the input message buffer, block 298, then begins to read the transmission rate or frequency of the audio signal, block 300. As previously described, an 0-bit is indicated by a first audio frequency, and a 1-bit is indicated by a second audio frequency. This routine will then inquire, decision block 302, whether the bit frequency is indicative of a 0-bit. If it is not a 0-bit frequency, the routine will inquire, decision block 306, if the minimum message length timer has timed out. If the minimum length timer has not timed out, the routine will return to block 298, otherwise it will inquire, decision block 308, if the carrier detect signal is present. If the carrier detect signal is absent, the routine will return to the idle routine 210, or otherwise up-count the squelch break counter, block 310, to increase the degree of squelch level. The routine will then inquire, decision block 312, if the squelch break counter is equal to a predetermined number N. If the count in the squelch break counter is not equal to N, the routine will jump to decision block 318, and again inquire if the carrier detect signal is present, otherwise the routine will adjust the squelch signal to a higher level, block 314, then clear the squelch break counter, block 316. After clearing the squelch break counter, the routine will proceed to inquire, decision block 318, if the carrier detect signal is still present. If the carrier detect signal is not present, it will return to the idle routine 210, otherwise it will again inquire, decision block 320, if the minimum message length time has expired. If it has not, the routine will return to decision block 318, otherwise the routine will return to the idle routine 210, FIG. 10.

Returning again to decision block 302, if the bit frequency is indicative of a 0-bit, the routine will start the preamble "0" minimum timer, block 304, then wait until the 0-bit preamble time is complete, blocks 322 and 324. When the 0-bit preamble time is over, the routine will start the preamble "1" search timer, block 326, then inquire, decision block 328, if the bit frequency is indicative of a 1-bit. If it is, the routine will go to the read bytes routine 330. If it is not, the read input routine will inquire, decision block 332, if the preamble "1" search time is over. If it is, the routine will inquire if the carrier detect signal is still present, decision block 308. If the preamble "1" search time is not over, the routine will return to decision block 328 and continue to check if the bit frequency corresponds to a 1-bit. The read input subroutine 294 will either read the bytes of the received message or return it to the idle routine 210.

Figure 12:
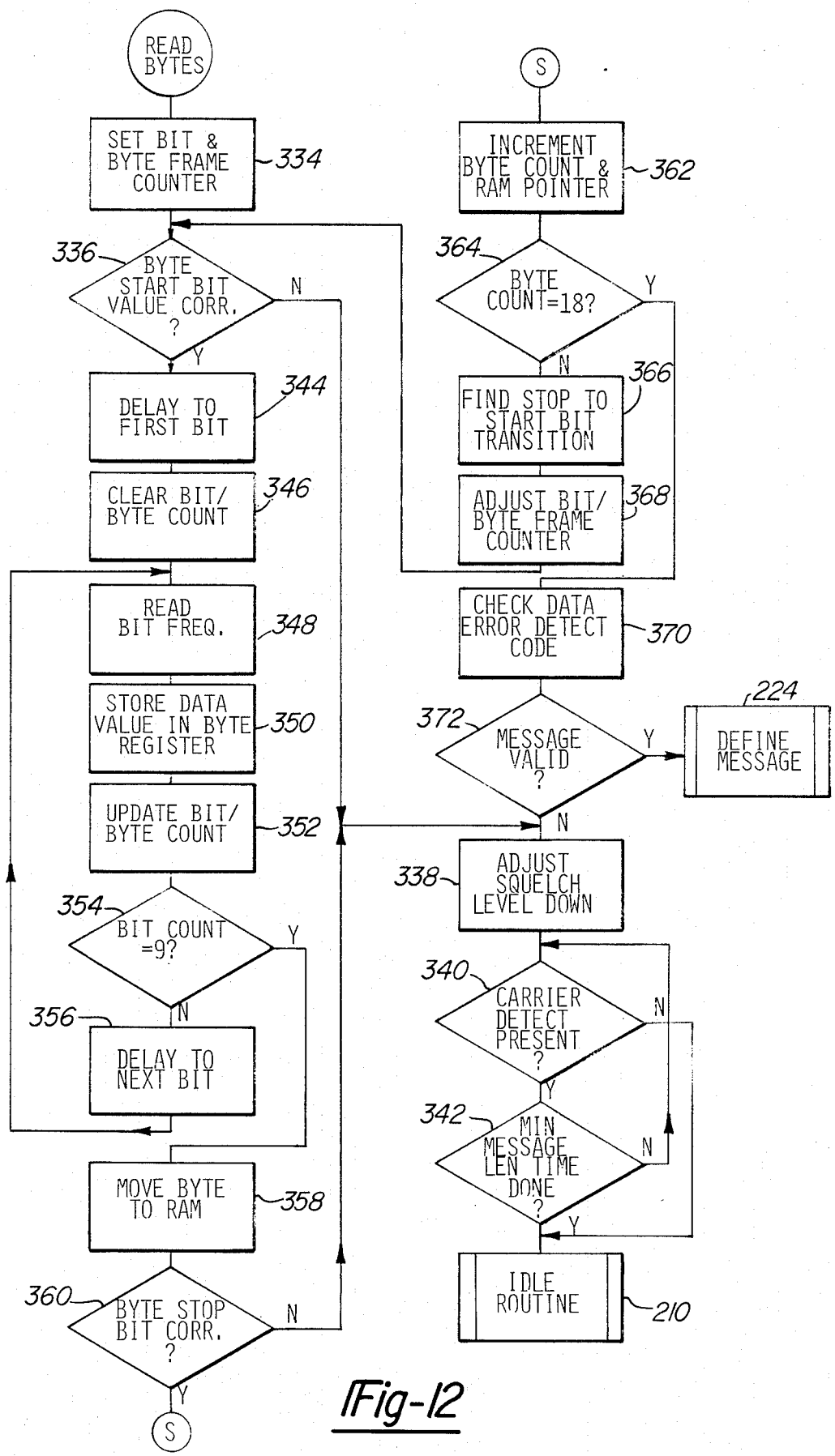
FIG. 12 is a flow diagram of the read bytes routine.

The details of the read bytes routine 330 are shown in FIG. 12. This routine begins by setting the bit and byte frame counters, block 334, then proceeds to inquire, decision block 336, if the byte start bit value is correct. If it is not, the read byte routine will adjust the squelch level signal down, block 338, and inquire, decision block 340, if the carrier detect signal is still present. If the carrier detect signal is no longer present, the routine will go back to the idle routine 210, otherwise it will inquire, decision block 342, if the minimum message length timer has timed out. If it has not, the routine will return to decision block 340, otherwise the routine ends and returns to the idle routine 210.

Returning to decision block 336, if the byte start bit value is correct, the read bytes routine delays until the first bit is received, block 344, and clears the bit/byte counter, block 346. Upon the reception of the data, the routine will detect the frequency of the bit, block 348, then store the bit value in a byte register, block 350. The routine will then increment the bit/byte counter, block 352, then inquire, decision block 354, if the bit counter is equal to 9, which is indicative of a complete byte. If it is, the routine will move the byte into a random access memory (RAM) as indicated by block 358, otherwise the routine will delay for the next received bit, block 356, then return to read the next bit, block 348.

After the byte is moved to the random access memory, the routine will inquire, decision block 360, if the byte (stop) bit is correct. If it is not, the routine will adjust the squelch level down, block 338, and return to the idle routine 210, as previously described. If the last bit in the stored byte is correct, the routine will increment the byte count of the RAM pointer, block 362, then inquire, block 364, if the byte count is 18 indicative of a complete message. If it is, the routine will then check the message's error detect code, block 370, then inquire, decision block 372 if the message is valid. If it is, the routine will initiate the define message routine. Otherwise, the routine will adjust the squelch level down, block 338, and exit back to the idle routine 210.

If the message is incomplete, i.e., count is less than 18, the routine will find the stop to start bit transition, block 366, adjust a bit/byte frame counter, block 368, and return to decision block 336 to decode and store the next byte.

Figure 13:
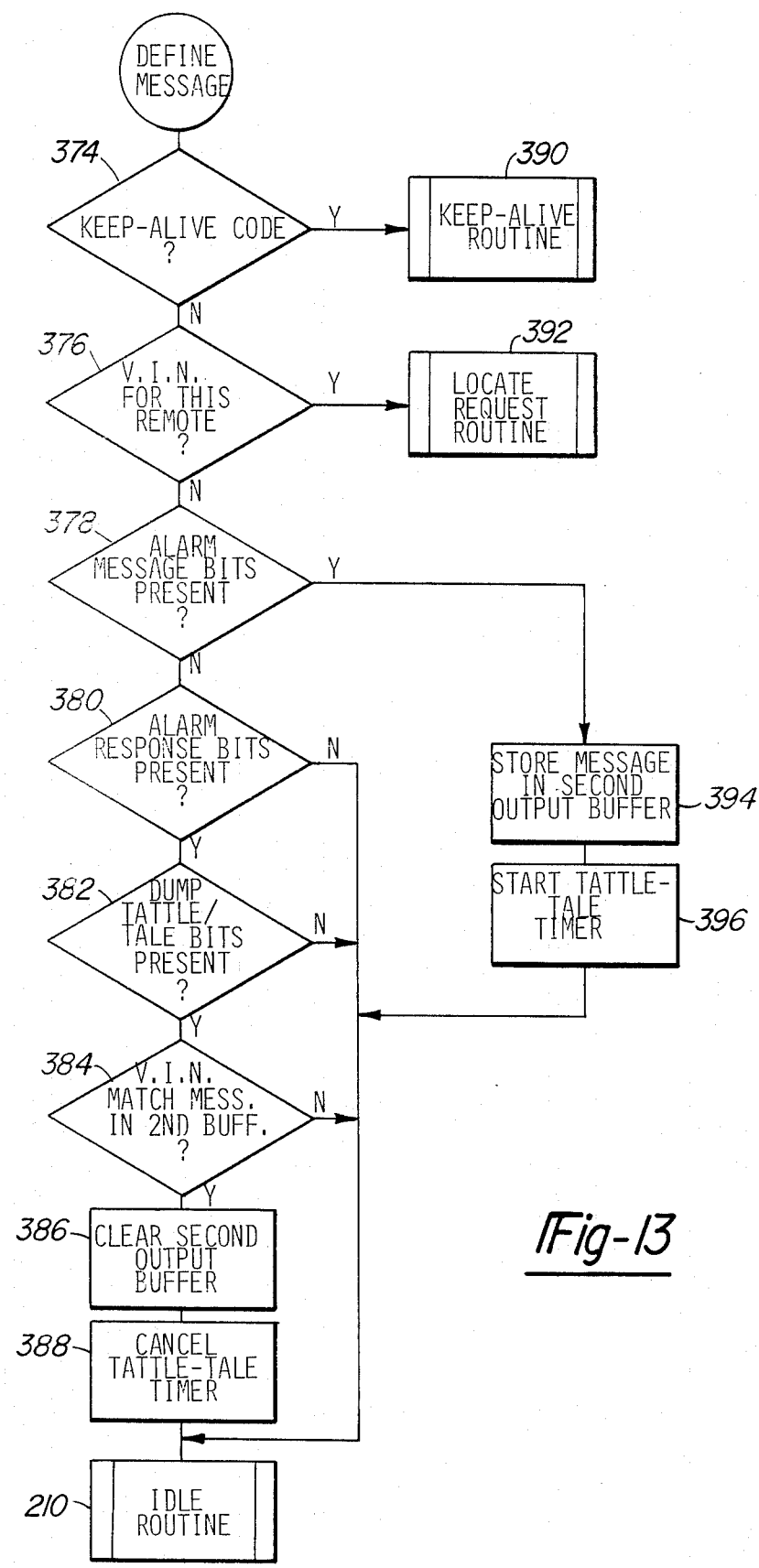
FIG. 13 is a flow diagram of the define message routine.

The details of the define message routine 224 are shown in FIG. 13. The function of this routine is to analyze the message stored in the RAM so that the vehicle unit will perform the requested function. It begins by first inquiring, decision block 374, if the code contained in the message stored in the RAM is a "keep alive" code. If it is, the routine will proceed to the "keep alive" routine, block 390. Otherwise, the routine will next inquire, decision block 376, if the vehicle indentification number (VIN) contained in the message is the same as its own vehicle identification number. If it is, the define message routine will proceed to the locate request routine 392, otherwise the routine will inquire, decision block 378, if the message contains alarm bits identifying it as an alarm message transmitted by a different vehicle unit. If the message contains alarm bits, the alarm message is stored in a second output buffer, block 394, and the tattle-tale timer is started, block 396. The program then returns to the idle routine 210. If the message is not an alarm message, the routine will inquire, block 380, if the message from the base station 30 is in response to the alarm message transmitted by the other vehicle unit whose alarm message is stored in the second output buffer. If it is not, the routine will return to the idle routine 210, otherwise the routine will inquire, decision block 382, if there are dump tattle-tale bits present, indicating the alarm message was received by the base station 30. If no dump tattle-tale bits are present, the routine will return to the idle routine 210, otherwise the routine will further inquire, decision block 384, if the vehicle identification number contained in the message is the same as the vehicle indentification number contained in the alarm message stored in the second output buffer. If it is not, the routine will return to the idle routine, otherwise it will clear the second output buffer, block 386, cancel the tattle-tale timer, block 388, and return to the idle routine.

Figure 14:
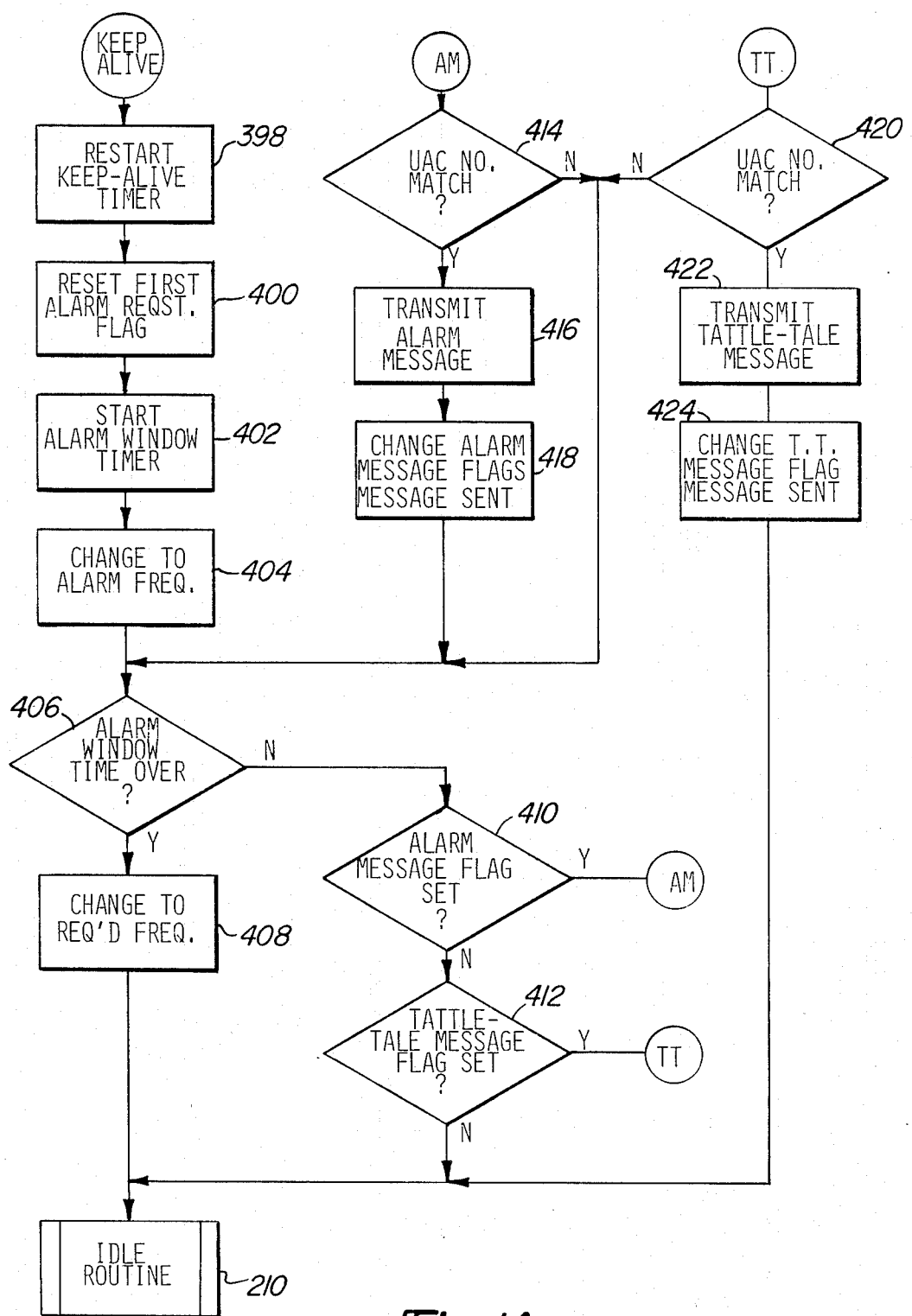
FIG. 14 is a flow diagram of the keep alive routine.

The details of the "keep-alive" routine are shown in FIG. 14.

Referring to FIG. 14, the keep alive routine begins with restarting the keep alive timer, block 398, resetting the first alarm flag, block 400, starting the alarm window timer, block 402, and changing the transmission frequency of the transmitter to the alarm frequency, block 404. The keep alive routine 390 will then inquire, decision block 406, if the alarm window time is over, signifying that the vehicle units 10 are permitted to transmit unsolicited communications. If the alarm window time is over, the transmission frequency of the transmitter will be changed to a frequency required by the base station 30, block 408, and return to the idle routine 210.

If the alarm window time is not over, the routine will inquire if the alarm message flag is set, block 410, indicating the keep alive timer has timed out. If the alarm message flag is not set, the routine will inquire, block 412, if the tattle-tale message flag is set. If the tattle-tale message flag is not set, the keep alive routine will return to the idle routine 210. However, if the alarm message flag is set, the keep alive routine 390 will inquire, block 414, if its unsolicited answer control U.A.C. number matches the unsolicited answer control number transmitted by the base station. This procedure is used to control the number of vehicle units which can transmit at the same time. Only a predetermined number of vehicle units have the same unsolicited answer control number. Other vehicle units will have different unsolicited answer control numbers.

If the unsolicited answer control numbers do not match, the routine will return to block 406, otherwise the routine will transmit an alarm message, as indicated by block 416, reset the alarm message flag to indicate the alarm message was sent, block 418, then return to decision block 406. In a like manner, if the tattle-tale message flag is set, block 412, the routine will again inquire, block 420, if the unsolicited answer control number matches that transmitted by the base station. If it does not, the routine will go back to decision block 406, otherwise it will transmit a tattle-tale message, block 422, reset the tattle-tale message flags to show the data was sent, block 424, then return to idle routine 210.

Figure 15:
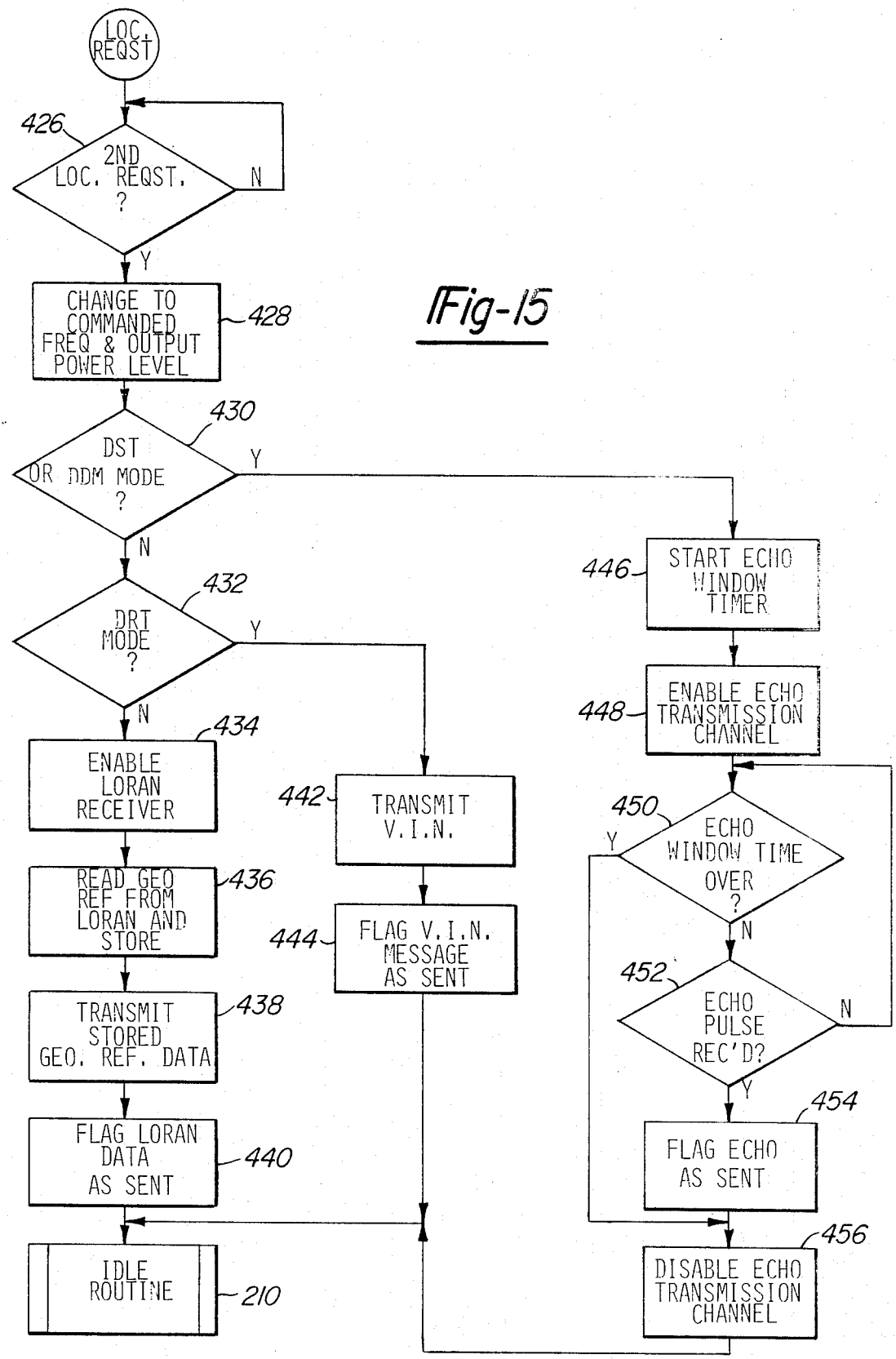
FIG. 15 is a flow diagram of the location request routine.

The details of the locate request routine 392 are shown FIG. 15. The locate request routine begins by inquiring, decision block 426, if the locate request is the second such request. If it is not, the routine will keep making this request until the second locate request is received. Upon receipt of the second locate request, the routine will then change the transmission frequency and power level of the transmitter to the frequency and power level commanded in the locate request message, block 428, then proceed to inquire which location mode is to be used. The routine will inquire, block 430, if the requested mode is the distance-triangulation mode (DST) or the distance-direction measurement (DDM) mode. If it is not, it will then inquire, block 432, if the requested mode is the direction-triangulation DRT mode. If it is not, the routine proceeds to enable the LORAN receiver, block 434, initiating the LORAN location mode. The routine will then read the LORAN geographical reference from the LORAN receiver, block 436, and store the data in a buffer. The routine will then activate the transmitter to transmit the stored geographical reference data stored in the buffer, block 438, set a flag signifying the LORAN data as sent, block 440, then return to the idle routine 210.

If the locate request message requests the distance-triangulation (DST) or distance-direction measurement (DDM) location mode, the routine will start the echo window timer, block 446, and enable the echo transmission channel from the receiver 12 to the transmitter 16, block 448. The routine will then inquire, decision block 450, if the echo window time is over. If the echo window time is over, the routine will proceed to disable the echo transmission channel, as indicated by block 456, otherwise the routine will inquire, decision block 452, if the echo pulse has been received. If the echo pulse has not been received, the routine will return to decision block 450 and inquire if the echo window time is over. Otherwise, after the echo pulse is received and retransmitted through the echo transmission channel, the routine will set a flag, block 454, signifying the echo pulse has been transmitted, disable the echo transmission channel, block 456, then return to the idle routine 210.

If the locate request message identifies the location mode as the direction-triangulation (DRT) mode, the routine will activate the transmitter 16 to transmit its own vehicle identification number (VIN), block 442, set a flag signifying the VIN message as sent, block 444, then return to the idle routine 210.

Those skilled in the art will recognize that although the location system is described with respect to vehicles, such as automobiles, trucks, aircraft, boats, or off-road vehicles, it may also be used to locate other valuable objects, such as electronic equipment or valuable machines. The vehicle unit 10 may also be incorporated into a briefcase or a shipping container which may be carrying valuable items, such as money, gems or precious metals.

Those skilled in the art will also recognize that the invention is not limited to the location of vehicles or to the four location methods described above. They will also recognize that the location system does not have to embody all four of these location methods. It is further recognized that a person skilled in the art may make changes to or modify one or more individual elements of the system without departing from the spirit of the invention as described herein and set forth in claims.

What is claimed is:

1. A system for locating a lost or stolen object comprising:

a plurality of object units capable of being operated in more than two different location modes, each object unit associated with a particular one of the objects to be located and having an identification number uniquely identifying the associated object, each object unit having a receiver for receiving locate request messages, a variable frequency transmitter for transmitting messages, and an electronic control for controlling the operation of said receiver and said variable frequency transmitter in response to information contained in said locate request messages, said locate request messages each containing at least one of said identification numbers uniquely identifying the particular one of said plurality of objects as the one to be located, a location code specifying which one of said at least two location modes are to be used to locate the object, and a frequency code specifying the transmission frequency of said variable frequency transmitter, said electronic control have means responsive to said identification number in said locate request message being the same as its own identification number to place said transmitter and receiver in the location mode specified by the mode code, and means to change the transmission frequency of said variable frequency transmitter to the frequency specified by said frequency code;

a location network cooperating with said location request messages and the messages transmitted by said object unit to generate signals and messages to be used to determine said object's location; and a base station having means responsive to external inputs from transmitting said locate request message and means for generating location data indicative of said object's location in response to the messages transmitted by said object unit and said location network.

2. The system of claim 1 wherein each of said object units further comprises:
   a detector for generating a signal in response to an unauthorized possession of said object;
   a transmitter for transmitting an alert signal in response to said signal generated by said detector; and
   a portable receiver responsive to said alert signal to generate a human perceptible signal at a location remote from said obejct.

3. The system of claim 1 wherein said base station transmits two sequential locate request messages separated by a predetermined time interval in response to each external input, said object units's electronic control includes means for delaying the placing of said transmitter and receiver into the specified location mode until the second of said two sequential locate request messages is received.

4. The system of claim 3 wherein one of said at least two location modes is the LORAN mode;
   said object unit includes a LORAN receiver for generating geographical data indicative of the object's location and said electronic control includes means for activating said LORAN receiver in response to the mode code of said locate request message specifying the location mode as the LORAN mode, and means for activating said transmitter to transmit said geographical data to said base station;
   said location network is any existing LORAN network; and
   wherein said base station has means for processing the transmitted geographical data to location data indicative of said object's location.

5. The system of claim 3 wherein one of said at least two location modes is a distance-triangulation mode:
   said object unit includes an echo channel connecting said receiver and said transmitter for transmitting a received echo pulse to said transmitter after a precise period of time and said electronic control has means for activating said echo channel in response to the mode code of the received locate request message specifying the location method as said distance-triangulation method;
   said location network comprises three remotely located receivers, each of said three remotely located receivers transmitting to said base station time data indicative of the time between the receipt of said echo pulse transmitted by said base station and the receipt of said echo pulse transmitted by said object unit; and
   said base station includes means for transmitting said echo pulse a predetermined time after the transmission of the second locate request message and means for processing said time data to generate location data indicative of said object's location.

6. The system of claim 3 wherein one of said at least two location modes is a distance-direction mode:
   said object unit includes an echo channel connecting said receiver to said transmitter for transmitting a received echo pulse to said transmitter after a precise period of time and said electronic control has means for activating said echo channel in response to the mode code of the received locate request message specifying the location method as said distance-direction mode;
   said location network comprises a direction finding receiver for generating direction data indicative of the direction from which said echo pulse transmitted by said object unit was received; and
   said base station has means for generating said echo pulse a predetermined time after the transmission of the second locate request message, means for generating time data indicative of the time between the transmission of said echo pulse and the receipt of said echo pulse transmitted by said object unit, and means for processing said direction data and said time data to generate location data indicative of the location of said object.

7. The system of claim 3 wherein one of said at least two location modes is a direction-triangulation mode:
   said electronic control activates said object unit's variable frequency transmitter to transmit a message containing said object unit's identification number in response to the mode code contained in a received locate request message specifying the location method as the direction-triangulation mode;
   said location network comprises three remotely located direction finding receivers, each of said direction finding receivers transmitting to said base station direction data indicative of the direction from which said message transmitted by said object unit was received; and
   said base station having means for processing said direction data to generate location data indicative of said object's location.

8. The system of claim 4 wherein each of said three remotely located direction finding receivers has means for transmitting a saturation signal to the base station indicative of said direction finder receiver being saturated by the message transmitted by said object unit;
   said base station includes means for including in the next locate request message a reduce power code specifying that said object unit reduce the power level of its transmission; and
   said object unit having means responsive to said reduce power code contained in said locate request message to activate said transmitter to transmit at a lower power level.

9. The system of claim 3 wherein said object unit has alarm message generating means comprising:
   a keep alive timer having a predetermined first keep alive time period;
   means for resetting said keep alive timer in response to a keep alive message transmitted by said base station; and
   means responsive to said keep alive timer timing out for activating said transmitter to generate an alarm message containing said object unit's identification number and an alarm message code signifying that the message is an alarm mesasge and for resetting said keep alive timer; and
   wherein said base station has means for repeatedly transmitting said keep alive signal at time intervals shorter than said keep alive time period and means responsive to aid alarm message for transmitting a locate request message containing said identification number contained in said alarm message.

10. The system of claim 9 wherein said object unit further comprises tattle-tale message generating means for relaying the alarm mesasge of a different object unit to said base station, said tattle-tale message generating means comprising:
    a tattle-tale timer having a predetermined tattle-tale time period;

a storage buffer;

means responsive to an alarm message transmitted by a different object unit for storing the identification number contained in said alarm message in said storage buffer and for starting said tattle-tale timer;

means responsive to a locate request message containing said indentification number stored in said storage buffer to clear said identification number stored in said storage buffer and cancel said tattle-tale timer; and means responsive to said tattle-tale timer timing out for transmitting a tattle-tale message containing its own identification number, said identification number stored in said storage buffer, and a tattle-tale code;

and wherein said base station includes means responsive to said tattle-tale message for generating a locate request message for the object unit that transmitted said tattle-tale message.

11. The system of claim 9 wherein said means for activating said transmitter activates said transmitter to transmit three sequential alarm messages.

12. The system of claim 11 wherein said means for activating said transmitter includes means for resetting said keep alive timer for a second keep alive time period greater than said first keep alive time period.

13. The system of claim 3 wherein said object unit has a visual display for displaying messages transmitted by said base station and means for transmitting the data to be displayed to said visual display in response to a display code contained in a display message received from said base station.

14. The system of claim 13 wherein said data to be displayed is one of a plurality of messages stored in said object unit and where said display message contains a code identifying said stored message to be displayed.

15. The system of claim 3 wherein said base station includes a recovery unit for recovering the object in response to said location data.

16. The system of claim 15 wherein said recovery unit includes a mobile unit operative to be driven to the location specified by said location data.

17. An object unit for a lost or stolen object location system having a base station for transmitting locate request messages and a location network, said locate request messages containing an identification number uniquely identifying the object to be located, a location mode code and a transmission frequency code, said object unit comprising:

a receiver for receiving said locate request messages transmitted by said base station;

a variable frequency transmitter for transmitting messages; and an electric control for controlling the operation of said object unit in one of at least two different location modes, said electronic control comprising means responsive to said identification number contained in said locate request message being its own identification number to activate said transmitter to transmit a message, means responsive to said location mode code to activate said object unit to cooperate with said base station and said location network to generate data indicative of said object's location, and means for controlling the transmission frequency of said transmitter in response to said transmission frequency code.

18. The object unit of claim 17 further comprising:

a detector for generating a signal in response to an unauthorized possession of said object;

a low power transmitter for transmitting an alert signal in response to said signal generated by said detector; and a portable receiver responsive to said alert signal for generating a human perceptible signal at a location remote from said object.

19. The object unit of claim 18 wherein one of said at least two location modes is a distance-direction location method, and said base station transmits an echo pulse a predetermined time after the transmission of said second locate request message, said object unit further has an echo channel connecting the output of said receiver to the input of said transmitter, said echo channel having means for delaying the transmission of said echo pulse to said transmitter by a precise period of time, and wherein said electronic control has means for activating said echo channel and enabling said transmitter to retransmit said echo pulse received from said base station in response to said location mode code of the received locate request message specifying said distance-direction location mode.

20. The object unit of claim 17 wherein said base station transmits two sequential locate request messages separated by a predetermined time interval, and said electronic control has means for delaying the activation of said transmitter until the second of said two locate request messages is received.

21. The object unit of claim 20 wherein one of said at least two location modes is a direction-triangulation location method, said electronic control activates said transmitter to transmit a message containing at least its own identification number in response to the location mode code contained in the locate request message specifying the direction-triangulation location mode.

22. The object unit of claim 20 wherein one of said at least two location modes is a distance-triangulation mode and said base station transmits an echo pulse a predetermined time after the transmission of said second locate request message, said object unit further has an echo channel connecting the output of said receiver to the input of said transmitter, said echo channel having means for delaying the transmission of said echo pulse to said transmitter by a precise period of time, and wherein said electric control has means for activating said echo channel and enabling said transmitter to retransmit said echo pulse received from said base station in response to said location mode code specifying the distance-triangulation location mode.

23. The object unit of claim 21 wherein said locate request message includes a reduce power code and said electronic control includes means for activating said transmitter at a reduced power level.

24. The object unit of claim 20 wherein one of said at least two location modes is the long range navigation (LORAN) location mode, said object unit includes a LORAN receiver for generating geographical data indicative of said object's location, and wherein said electronic control has means for activating said LORAN receiver in response to said location mode code of the received locate request message specifying said location mode as said LORAN mode and means for activating said transmitter to transmit a message containing the geographical data generated by said LORAN receiver.

25. The object of claim 20 wherein said base station transmits a keep alive message at predetermined intervals, said object unit further comprising:
a keep alive timer having a predetermined period longer than said predetermined interval between said keep alive messages;
means for resetting said keep alive timer in response to said keep alive messages; and
means responsive to said keep alive timer timing out for activating said transmitter to transmit an alarm message containing at least said identification number of said object unit and for resetting said keep alive timer.

26. The object unit of claim 25 wherein said means for activating said transmitter activates said transmitter to transmit three sequential alarm messages.

27. The object unit of claim 25 including tattle-tale means comprising:
a tattle-tale timer for generating a tattle-tale time period;
a storage buffer;
means responsive to an alarm message transmitted by a different object unit for storing said identification number contained in said alarm message in said storage buffer and for starting said tattle-tale timer;
means responsive to a subsequent locate request message containing said identification number stored in said storage buffer, for clearing said storage buffer, and for cancelling said tattle-tale timer; and
means responsive to said tattle-tale timer timing out to activate said transmitter to transmit a tattle-tale message containing its own identification number and said identification number stored in said storage buffer.

28. The object unit of claim 17 wherein said object is a vehicle and said unauthorized possession is an illegal entry into said vehicle.

29. The object unit of claim 17 wherein said base station transmits a display message containing data to be displayed, said object unit includes a visual display and means for transmitting said data contained in said display message to said visual display.

30. The object unit of claim 29 wherein said data to be displayed is one of a plurality of messages stored in said object unit and said data contained in said display message is a code uniquely identifying one of said stored message.

31. A system for locating a stolen vehicle comprising:
a vehicle unit adapted to be mounted in each vehicle included in said system, each vehicle unit having at least one receiver for receiving messages from external sources, a variable frequency transmitter for transmitting messages and relaying received signals, and an electronic control unit, said electronic control unit having means for decoding said received messages and means for controlling the operation of said vehicle unit in at least two different location modes and means for controlling the transmission frequency of said variable frequency transmitter in accordance with the information contained in said received messages;
location network means cooperating with said vehicle unit for generating data useful in the determination of said vehicle's location; and
a base station, having a transmitter for transmitting said signals to said vehicle unit, a base station receiver for receiving messages and signals transmitted by said vehicle unit, and an electronic control unit, said electronic control unit having means responsive to an external input identifying the vehicle to be located for activating said base station transmitter to transmit a locate request message to the vehicle unit of said stolen vehicle, said location request message specifying which of said at least two location modes are to be activated and the transmission frequency of said vehicle unit's variable frequency transmitter, and means responsive to messages received from said vehicle and said location network means for determining the location of said vehicle.

32. The system of claim 31 wherein said vehicle unit further comprises:
an illegal entry detector for generating an illegal entry signal when said vehicle is illegally entered;
a transmitter for generating an alert signal in response to said illegal entry signal; and
a portable receiver carried by the owner/operator of said vehicle for generating a human perceptible signal in response to said alert signal to alert the owner/operator of the possibility that said vehicle has been stolen so that its theft may be reported as early as possible.

33. The system of claim 31 wherein each vehicle in said system has a vehicle identification number uniquely identifying each vehicle, said base station electronic control unit activates said base station transmitter to transmit a locate request message containing said stolen vehicle's vehicle identification number, and wherein said vehicle unit's electronic control unit includes means for comparing said vehicle identification number contained in said locate request message with its own vehicle identification number to determine if it is the vehicle whose location is to be determined.

34. The system of claim 33 wherein said base station transmitter will transmit two sequential locate request messages separated by a predetermined time interval, each locate request mesasge containing the vehicle identification number of said stolen vehicle's electronic control unit responsive to the reception of only the second of said two sequential locate request signals.

35. The system of calim 31 wherein said base station transmits keep alive signals at predetermined intervals, said vehicle unit having alarm means comprising:
a keep alive timer having a keep alive time period shorter than said predetermined intervals of said keep alive signals;
means for resetting said keep alive timer in response to said keep alive signals; and
means for transmitting an alarm message in response to said keep alive timer timing out, and means for resetting said keep alive timer after transmitting said alarm message, said alarm message containing at least the vehicle identification number of said vehicle unit and a code identifying the transmitted message as an alarm message.

36. The system of claim 35 having tattle-tale means comprising:
a tattle-tale timer having a tattle-tale time period;
a storage buffer;
means responsive to a different vehicle unit transmitting an alarm message for storing the identification number stored in said alarm message in said storage buffer;
means responsive to a subsequent locate request message containing the identification number stored in said storage buffer for clearing said storage buffer and cancelling said tattle-tale timer; and means responsive to said tattle-tale timer timing out to generate a tattle-tale message containing the vehicle unit's own identification number, said identification number being stored in said storage buffer, and a code identifying the message as an alarm message.

* * * * *

UNITED STATES PATENT AND TRADEMARK OFFICE
CERTIFICATE OF CORRECTION

PATENT NO. : 4,742,357

DATED : May 3, 1988

INVENTOR(S) : Ernie C. Rackley

It is certified that error appears in the above-identified patent and that said Letters Patent is hereby corrected as shown below:

Column 1, line 65, delete "GEOSTAR" and insert ---- "GEOSTAR" ----.

Column 5, line 51, delete "SC2" and insert ---- SX2 ----.

Column 5, line 62, delete "a" and insert ---- an ----.

Column 8, line 39, delete "otehr" and insert ---- other ----.

Column 9, line 8, delete "RD", and insert --- RF --.
----.

Column 9, line 11, delete "oscillaor" and insert ---- oscillator ----.

Column 9, line 21, delete "an" and insert ---- a ----.

Column 9, line 42, delete "of" and insert ---- to ----.

Column 9, line 55, after "input" insert ---- to ----.

Column 9, line 64, delete "I" and insert ---- J ----.

UNITED STATES PATENT AND TRADEMARK OFFICE
CERTIFICATE OF CORRECTION

PATENT NO. : 4,742,357
DATED : May 3, 1988
INVENTOR(S) : Ernie C. Rackley

It is certified that error appears in the above-identified patent and that said Letters Patent is hereby corrected as shown below:

Column 10, line 31, after "$MH_2$" insert ---- signal ----.

Column 11, line 47, delete "anotehr" and insert ---- another ----.

Column 12, line 31, delete "alarmmr" and insert ---- alarm ----.

Column 12, line 53, delete "iquire" and insert ---- inquire ----.

Column 13, line 28, delete "326 ," and insert ---- 326, ----.

Column 13, line 60, delete "counter" and insert ---- count ----.

Column 15, line 31, after "shown" insert ---- on ----.

In the Claims

Column 16, line 51, delete "have" and insert ---- having ----.

Column 16, line 64, delete "from" and insert ---- for ----.

Column 17, line 14, delete "units's" and insert ---- unit's ----.

Column 18, line 59, delete "aid" and insert --- said ---.

Column 18, line 64, delete "mesasge" and insert ---- message ----.

UNITED STATES PATENT AND TRADEMARK OFFICE
CERTIFICATE OF CORRECTION

PATENT NO. : 4,742,357

DATED : May 3, 1988

INVENTOR(S) : Ernie C. Rackley    Page 3 of 3

It is certified that error appears in the above-identified patent and that said Letters Patent is hereby corrected as shown below:

Column 20, line 46, delete "electric" and insert ---- electronic ----.

Column 21, line 1, after "object" insert ---- unit ----.

Column 22, line 34, after "the" insert ---- stolen ----.

Column 22, line 39, delete "mesasge" and insert ---- message ----.

Column 22, line 43, delete "calim" and insert ---- claim ----.

Signed and Sealed this

Twenty-fifth Day of October, 1988

Attest:

DONALD J. QUIGG

Attesting Officer    Commissioner of Patents and Trademarks